April 10, 1928.
E. PETERSON
1,665,325
ELECTRICAL NETWORK AND ITS OPERATION
Filed March 18, 1926
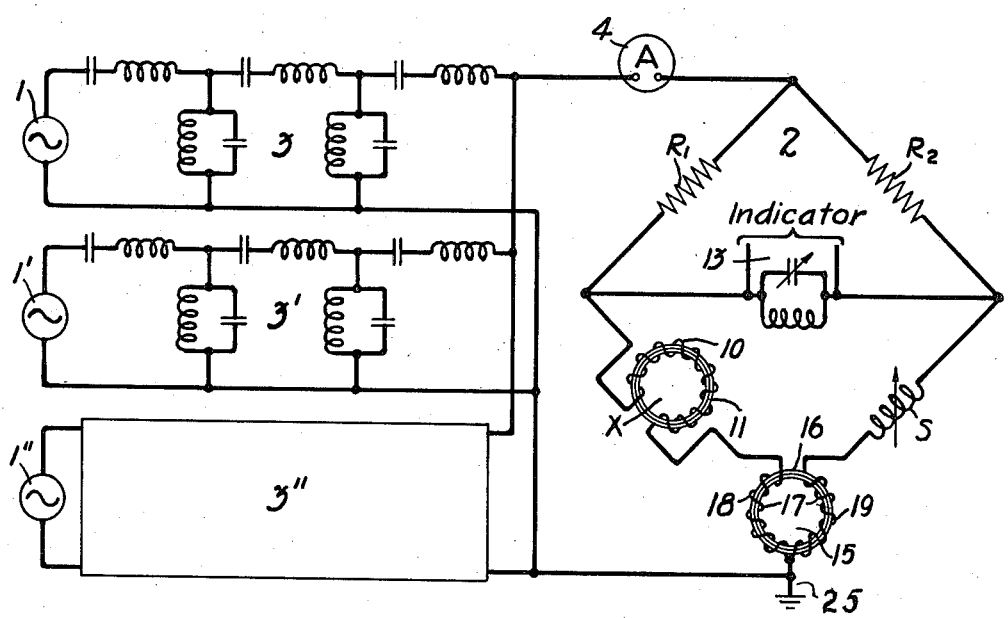
Inventor:
Eugene Peterson
by J.C.Roberts Att'y.

Patented Apr. 10, 1928.

1,665,325

UNITED STATES PATENT OFFICE.

EUGENE PETERSON, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL NETWORK AND ITS OPERATION.

Application filed March 18, 1926. Serial No. 95,810.

This invention relates to networks of electrical paths and relates especially to electrical testing with such networks.

An object of the invention is to suppress undesired electrical variations tending to occur in electrical paths.

Another object is to enable the examination of electrical qualities or electrical characteristics.

As a specific example of applications of the invention there is described herein the operation of a Wheatstone bridge network, embodying one form of the invention, in measuring the impedance of a magnetic modulator coil or other type of, modulator connected in one arm of the bridge. A modulator, as broadly considered and as used in this description and later in the claims, is simply a non-linear conducting device, that is, a device in which the relation between the impressed voltage and resulting current, and therefore the impedance, varies with variations in such impressed voltage. When there are two voltage waves impressed on the modulator the non-linear charactertistic results in the production of certain new waves whose frequencies are multiples of the frequencies of the impressed waves and others whose frequencies are the sum and difference of the frequencies of the impressed waves. Of course when a single voltage wave is impressed there will be produced only the multiple frequency waves. The fact of the production of the new frequencies means that the modulator element serves as a wave generator with respect to such new frequencies. That a coil having a magnetic core is a modulator is evident from the fact that the slope of the saturation curve, which of course is non-linear, gives a measure of the permeability and therefore of the impedance, of such coil, which impedance must therefore also be non-linear.

When current waves from a source external to the bridge are sent through the two sides of the bridge in parallel, for comparing the impedance of a modulator coil with a known variable impedance in the ordinary way in which such comparisons are made by means of Wheatstone bridges, the modulator coil will therefore act as a source of E. M. F. effective to send modulated currents through the closed paths terminating at the bridge arm in which the modulator coil is connected. This action of the modulator coil may affect the impedance measurement adversely, as for example, by upsetting the balance of the bridge for currents of frequency supplied to the bridge by the external source.

In the specific form of the invention shown in the drawing the adverse effect of modulated currents on the impedance measurement is overcome by a retard coil which has one-half of its winding connected in one side of the bridge, in the same bridge arm as the modulator coil, and has the other half of its winding closely coupled to the first half magnetically and connected in the adjacent bridge arm of the other or parallel connected side of the bridge.

The current from the external source flows through the two halves of the retard coil winding in opposite directions, at any instant, and therefore is not materially impeded by the retard coil; but since any modulated current produced by the modulator coil does not cause the two halves of the retard coil winding to act in opposition to each other, the retard coil offers such high impedance to the modulated currents as to substantially suppress them and thereby avoid the deleterious effect upon the impedance measurement.

It is also a feature of the form of the invention shown in the drawing, that the impedance measurement may be made under load conditions of the modulator which simulate certain load conditions encountered in practical operation of the modulator. This may be accomplished by causing currents of different frequencies, such as for example the frequencies of load currents which may pass through the modulator in practical operation, to flow simultaneously in the modulator, and, during that flow, measuring the effective impedance of the modulator to certain ones of those currents, having certain ones only of those frequencies.

It is a further feature of the form of the invention shown in the drawing, that the impedance which the external source or supply circuit presents to the bridge is made high for frequencies other than those supplied by that source, with consequent increase in the impedance presented to the modulated products which are generated in the modulator and pass through but one half of the winding of the retard coil and through the external supply circuit.

Other features, objects and aspects of the invention will be apparent from the following description and the claims.

The single figure of the drawing is a diagrammatical representation of the specific form of the invention referred to above.

In the drawing, a source of E. M. F. waves 1, supplies current to a Wheatstone bridge 2, through an electrical wave filter 3 and an ammeter 4. The bridge, comprises the usual known resistances or impedances $R_1$ and $R_2$ and standard or known variable impedance S for balancing the bridge with an unknown impedance X, or impedance to be measured, inserted in the bridge.

The impedance X is intended to represent any impedance which it is desired to measure and which distorts the waves sent through it from generator 1, or is effective as a generator of waves of frequency other than that supplied to it. The impedance X is shown, by way of example, as a coil 10 on a toroidal ferro-magnetic core 11, and may constitute, or form a part of, a magnetic modulator.

The bridge comprises an indicator 13 of any suitable type, such as for example an electric space discharge detector or amplifier and a telephone, for indicating the condition of balance of the bridge, the input circuit for the indicator preferably having frequency selective means which may be made to select the frequency at which it is desired to measure the impedance of X. The adjustable tuned circuit shown at 13 in the drawing is intended to represent any suitable frequency selective means.

In accordance with the invention a retard coil 15 having a reactance high compared with the impedance of X, as for example, a reactance of the order of 100,000 ohms with the two halves of its winding connected in series aiding relation to each other, is inserted in the bridge. The retard coil as shown comprises a toroidal magnetic core 16 and a coil 17 consisting of windings 18 and 19 with the same number of turns or the same inductance. However, if desired, the magnetic core may be omitted. One winding, 18, is connected in the same bridge arm as the modulator coil. The other winding, 19, is connected in the adjacent bridge arm in which, at any given instant, the direction of flow of current supplied from the source external to the bridge is opposite to the direction of flow in the arm including winding 18, with respect to the junction point of these two arms. Preferably the coefficient of coupling between windings 18 and 19 is as great as possible or substantially unity.

The filter 3 is shown as a narrow band pass filter of a type set forth in Campbell Patent 1,227,114, May 22, 1917, and attenuates and suppresses harmonics of the frequency of source 1. For a purpose set forth hereinafter the termination of the filter which faces the bridge should be a series termination presenting to the bridge an impedance high for all frequencies lying outside of the pass range of the filter. Preferably the bridge is grounded at 25 for the purpose of maintaining the bridge at definite potentials and so avoiding effective alteration of the parasitic impedances to ground.

If desired, a generator 1' and filter 3', similar to generator 1 and filter 3, but supplying a different frequency to the bridge, may be connected in parallel with the generator 1 and filter 3. Similarly, still a different frequency may be supplied from a similar generator 1'' and filter 3'', and this multiplication of sources, each of different frequency, may be carried on to any extent desired. Then, during measurement of the impedance of the modulator X at any desired frequency supplied by one of the generators—circuit 13 being tuned to such desired frequency—, the modulator may be excited or loaded with currents of not only that frequency but also the frequencies supplied by the other generators, so that the impedance measurement may, if desired, be made under load conditions of the modulator which simulate certain load conditions encountered in practical operation of the modulator, in which, for example, it is common practice to impress a complex wave such as a voice wave, that is, one which has a plurality of frequency components. When more than one generator-filter combination is used, of course the meter 4, which is described herein only with reference to the generator-filter combination 1, 3, would be replaced by a set of meters each individual to one such combination.

The measurement of the impedance of a modulator involves considerations not present in the case of the usual, or constant impedances measured with Wheatstone bridges. In the case of the modulator it is ordinarily desired to know the impedance for a wide range of current values of current supplied to the modulator by a source such as 1, this current range including currents of such values as would traverse the modulator in its ordinary operation; and when current from the source such as 1 is supplied to the modulator, the varying reaction of the modulator may be looked upon as producing a modulated voltage—harmonic, in the case of a single frequency input—which leads to the flow of modulated current in the circuit, and this current may affect in three distinct ways the results obtained in attempting to measure the modulator impedance.

First, the modulated currents being of different frequency from that of the fundamental may affect the modulator to an extent characteristic of the modulator. This is particularly evident in magnetic modulators where the permeability of the material of the magnetic circuit and therefore the impedance changes rapidly with superimposed currents. Second, the distribution of the modulated products differs from that of the fundamental and the measured current will in general differ from that actually flowing through the modulator unless the current measuring device is placed in the same bridge arm as the modulator. Even if it were placed in that arm, the ammeter reading would depend upon the modulated currents as well as the current of the fundamental frequency or frequency of source 1; whereas it is desired to know the value of the fundamental current to which the measured impedance corresponds. Third, since the modulator may be regarded as an impedance varying periodically in time, the modulated currents flowing through this variable impedance may produce voltage components across the modulator of the fundamental frequency. Since the measurement of impedance on the bridge is in effect a measurement of voltage, it follows that these components are interpreted in terms of the modulator impedance. It is to be observed that the amount and distribution of these voltage components between resistance and reactance depends upon the amount of modulated current flowing and upon its phase; in other words the distribution depends upon the impedance of the bridge network to those harmonics which produce fundamental voltage components across the coil. It is therefore possible to obtain different apparent impedances on different bridges and it is also possible to have the result depend upon the amount of harmonics in the supply voltage as well as upon the method of making the balance. Thus, in a specific case the measured effective resistance of certain magnetic modulators has been found to vary by a factor of 2 depending upon whether the reactance of the coil was annulled by series capacity or was balanced by a similar inductance in the opposite bridge arm. While the true impedance of any modulator in operation must therefore be determined in the circuit in which it is used, and for this purpose the bridge is unsuitable in the general case, the impedance as measured on the bridge may be made quite definite, and therefore of considerable value as an indication of the modulator characteristics, by suppressing the modulated products not through frequency discrimination but through the use of a balanced coil such as 15 having a high mutual inductance between the two halves of its winding and connected as shown in the attached drawing.

In the operation of the system shown, currents of any one of the values and frequencies at which it is desired to measure the impedance of the modulator are sent through the modulator coil from one of the external sources, say source 1, indicator 13 is adjusted to be selective to this frequency, and the bridge is adjusted to the balanced condition by impedance S. As indicated above, if desired, currents of other frequencies may be supplied to the bridge from other sources, such as 1' and 1'', during this measurement, to more closely simulate practical load conditions for the modulator. In this balanced condition of the bridge the two branch currents of each fundamental frequency passing from one of the sources such as 1, 1' and 1'' through the retard coil will cause the retard impedance for those frequencies to balance out, while the currents due to modulated voltages generated by the modulator X will meet the series impedance of the coil since the modulated currents tend to flow in closed paths terminating at X.

When the current flows through the bridge from one of the outside sources it flows through the equal halves of the retard coil in parallel. The mutual inductance between the two halves is such as to oppose the self-inductance. The resulting impedance is zero for the case where there is a perfect coupling. Therefore the retard coil does not affect the impedance of the bridge to the currents of the outside source.

When currents flow through the two halves of the coil 15 in series from the source of modulated currents in the bridge, the resultant impedance equals twice the self-inductance of each of the windings 18 and 19, plus twice their mutual inductance. This impedance is so large, that the modulated currents have practically zero value.

The filter 3 has a series termination, to (1) present a high impedance to the modulation products generated in the modulator, in order to increase the impedance presented to those products which pass through but one winding of the retard and the circuit containing the generator 1, and (2) present to the other filters, such as 3' and 3'', an impedance high for all frequencies lying outside of the pass range of filter 3, in order to avoid by-passing around the bridge the currents supplied through those other filters from generators such as 1' and 1''.

The other filters are similar to filter 3, in the respect just considered, for similar reasons.

With the system shown in the drawing, then, the measured impedance will be dependent upon the fundamental currents alone, instead of also upon the modulated currents, and moreover will not be dependent upon the bridge structure.

The employment above, and in the claims, of the expressions "electrical paths," "electrical stream" and the like, are not to be regarded as precluding a broad view of the invention in which the term "electrical" is generic to "electromagnetic" and "magnetic."

What is claimed is:

1. An electrical circuit comprising impedance whose value varies in response to current variations therethrough, closed paths terminating at said impedance, a source of electro-motive force connected to said circuit for causing current variations and consequently impedance variations in said impedance, and impedance in series with said first impedance with respect to said paths, for substantially preventing any flow of current tending to occur due to said impedance changes.

2. In combination a Wheatstone bridge, a source of measuring potential therefor, said bridge having in one arm means effective as a driving force with respect to the other arms of said bridge, said bridge comprising passive impedance to an electrical stream from said source, said impedance having such value and such location in said bridge as to substantially suppress any electrical stream tending to occur in said arms as a result of said force.

3. A Wheatstone bridge having in one arm means effective as a driving source of electromotive force in said arm, and having an inductance in said arm in series with said means with respect to the closed paths through said bridge which terminate at said arm, said inductance having a value sufficiently great to substantially suppress current tending to flow as a result of said electromotive force.

4. A Wheatstone bridge in accordance with claim 2, in which said impedance comprises impedance in said one arm and impedance in an adjacent arm, said source being connected to such junction points of the bridge as to send electrical variations simultaneously in opposite directions in said adjacent arms with respect to the junction point of said adjacent arms.

5. A Wheatstone bridge in accordance with claim 2, in which said impedance comprises impedance in said one arm and impedance in an adjacent arm, said source being connected between the junction point of said two arms and the diagonally opposite corner of the bridge.

6. A measuring network comprising a Wheatstone bridge having arms one of which includes a calibrated network element variable for balancing the bridge, said bridge including inductances in adjacent arms of the bridge, including the first mentioned arm, whose reactances at the frequency of measurement are great in comparison with the impedance of said calibrated network, means for sending electrical variations simultaneously in opposite directions in said adjacent arms with respect to the junction point of said adjacent arms, said inductances being so related mutually as to balance out for said oppositely directed variations.

7. A measuring circuit comprising a Wheatstone bridge having arms one of which includes a calibrated impedance variable for balancing the bridge, said bridge including inductances in adjacent arms of the bridge, including the first mentioned arm, whose reactances at the frequency of measurement are great in comparison with the value of said impedance, and said circuit comprising means for sending electrical variations simultaneously in opposite directions in said adjacent arms with respect to the junction point of said adjacent arms, said inductances being so related mutually as to balance out for said oppositely directed variations and to add their impeding effects with respect to flow of current serially through said two adjacent arms.

8. A Wheatstone bridge network comprising a source of electrical variations, a path for electrical variations, and arms connecting said path and said source in conjugate relation to each other, one of said arms including a modulator, and inductances of high value in two adjacent arms of said network, said inductances being so related mutually as to balance out electrical variations from said source and to add their impeding effects with respect to flow of electrical variations serially through said two adjacent arms from said modulator.

9. A network comprising a mesh and a source for supplying electrical variations to said mesh, said network having means for rendering said mesh effective as a driving source of electrical variations, with respect to said first source, in response to said first mentioned electrical variations, and a wave filter between said first source and said mesh, said filter presenting to said second mentioned variations an impedance sufficiently high to substantially suppress current tending to flow through said impedance due to said second mentioned variations.

10. A network in accordance with claim 9, in which said mesh is a Wheatstone bridge and said means is a modulator in an arm of said bridge, and the attenuation frequency range of said filter includes harmonics of said first mentioned variations.

11. In a method of measuring the impedance of a modulator, applying to said modulator electro-motive force of substantially the amplitude and frequency of an electro-motive force for which said modulator is designed to be used during modulation, and so impeding flow of modulated current from said modulator as to substantially prevent said modulator from delivering modulated current components during said measuring.

12. In combination, a Wheatstone bridge comprising a modulator, and two sources of electro-motive force each supplying to said bridge current of frequency different from that supplied to the bridge by the other of said sources, each of said sources being external to said bridge, said bridge comprising means for balancing said bridge for one of said frequencies and means for obtaining and indicating the balance condition of said bridge for currents of one of said frequencies while said currents of different frequency are traversing said path, said means being adapted to annul the effect of modulated components generated in the modulator.

In witness whereof, I hereunto subscribe my name this 17th day of March A. D., 1926.

EUGENE PETERSON.